United States Patent
Hu et al.

(10) Patent No.: US 10,056,830 B2
(45) Date of Patent: Aug. 21, 2018

(54) CONTROL SCHEME FOR DC-DC POWER CONVERTERS WITH ULTRA-FAST DYNAMIC RESPONSE

(71) Applicant: Texas Instruments Incorporated, Dallas, TX (US)

(72) Inventors: Zhiyuan Hu, Dallas, TX (US); Jian Liu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/384,826

(22) Filed: Dec. 20, 2016

(65) Prior Publication Data
US 2018/0175725 A1  Jun. 21, 2018

(51) Int. Cl.
H02M 3/156 (2006.01)
H02M 3/158 (2006.01)
H02M 1/08 (2006.01)

(52) U.S. Cl.
CPC ............. H02M 3/156 (2013.01); H02M 1/08 (2013.01); H02M 3/158 (2013.01); H02M 3/1584 (2013.01); H02M 2003/1566 (2013.01)

(58) Field of Classification Search
CPC .................. H02M 3/156; H02M 1/08; H02M 2001/0019; H02M 2001/0045;
(Continued)

(56) References Cited

U.S. PATENT DOCUMENTS 8,242,764 B2  8/2012  Shimizu et al.

2008/0224672 A1*  9/2008  Trochut ............... H02M 3/158
323/268
(Continued)

FOREIGN PATENT DOCUMENTS

KR  20020017844 A  3/2002

OTHER PUBLICATIONS

Meyer, Eric; Zhang, Zhiliang; Liu, Yan-Fei; "Controlled Auxiliary Circuit to Improve the Unloading Transient Response of Buck Converters," IEEE Transactions on Power Electronics, vol. 25, No. 4, Apr. 2010, pp. 806-819.
(Continued)

*Primary Examiner* — Fred E Finch, III
*Assistant Examiner* — Demetries A Gibson
(74) *Attorney, Agent, or Firm* — Tuenlap D. Chan; Charles A. Brill; Frank D. Cimino

(57) ABSTRACT

Methods and apparatus for determining a value of a pulse-width modulation (PWM) signal with which to drive a power stage of a DC-to-DC voltage converter having an output inductor coupled between the power stage and an output node that is couplable to a load. A plurality of control schemes for determining a value of a PWM signal with which to drive the power stage are maintained. A value of the PWM signal currently driving the power stage is monitored. A value of an inductor current flowing through the output inductor is monitored. A value of a load current being provided to the load is monitored. One of the plurality of control schemes is selected based on the value of the PWM signal currently driving the power stage, the value of the inductor current, and the value of the load current. The selected control scheme is used to determine a value of a PWM signal with which to drive the power stage.

16 Claims, 5 Drawing Sheets

(58) Field of Classification Search
CPC ....... H02M 2003/1566; H02M 3/1584; H02M 2001/009; H02M 3/158
See application file for complete search history.

(56) References Cited

U.S. PATENT DOCUMENTS

| | | | | |
|---|---|---|---|---|
| 2009/0121696 | A1 | 5/2009 | Chien et al. | |
| 2010/0026267 | A1* | 2/2010 | Easwaran | H02M 3/158 323/282 |
| 2010/0123443 | A1* | 5/2010 | Grimm | H02M 3/156 323/282 |
| 2013/0285626 | A1* | 10/2013 | Chen | H02M 1/32 323/271 |
| 2014/0176095 | A1* | 6/2014 | Yang | H02M 3/158 323/271 |
| 2014/0375286 | A1* | 12/2014 | Jiang | H02M 3/156 323/271 |
| 2014/0375375 | A1* | 12/2014 | Horvat | H02M 3/157 327/374 |
| 2015/0137777 | A1* | 5/2015 | Chen | H02M 3/1588 323/271 |
| 2015/0171732 | A1 | 6/2015 | Kim | |
| 2016/0087526 | A1* | 3/2016 | Satake | H02M 1/36 323/282 |
| 2016/0344290 | A1* | 11/2016 | Yang | G01R 19/0092 |
| 2016/0352225 | A1* | 12/2016 | Langlinais | H02M 3/157 |
| 2018/0048230 | A1* | 2/2018 | Park | G05F 1/56 |

OTHER PUBLICATIONS

Jia, Liang; Liu, Yan-Fei; "Voltage Based Charge Balance Controller Suitable for Both Digital and Analog Implementations," IEEE Transactions on Power Electronics, vol. 28, No. 2, Feb. 2013, pp. 930-944.

Notification of Transmittal of the International Search Report and the Written Opinion of the International Searching Authority, or the Declaration; dated May 24, 2018, 7 pages.

* cited by examiner

MULTIPLEXER INPUT SELECTION TABLE

| SELECT 0 (LSB) \ SELECT 1 (MSB) | PWM = LOW (0) | PWM = HIGH (1) |
|---|---|---|
| INDUCTOR CURRENT > LOAD CURRENT (0) | CH 00: FORCED OFF (DOWN-TRACKING STATE) | CH 10: CONSTANT-ON TIMER DETERMINES TURN-OFF TIME POINT (CONSTANT-ON STATE) |
| INDUCTOR CURRENT < LOAD CURRENT (1) | CH 01: CHARGE-BALANCE CONTROL LOGIC DETERMINES TURN-ON TIME POINT (CONTROL STATE) | CH 11: FORCED ON (UP-TRACKING STATE) |

CONTROL SCHEME FOR DC-DC POWER CONVERTERS WITH ULTRA-FAST DYNAMIC RESPONSE

BACKGROUND

The increasing demand of integrating electronic devices onto automotive, industrial, and consumer platforms requires more sophisticated power conversion and distribution designs. Often these electronic devices include embedded processors, memories, and other electronic components that are operated from one battery source. DC-to-DC voltage converters are used to supply different voltages to the different electronic components.

Switching DC-to-DC voltage converters are popular because of their high efficiency over a wide voltage input range. In contemporary low-power switching DC-to-DC converters, voltage regulation is achieved by pulse-width modulation (PWM). In pulse-width modulation, a control circuit produces a rectangular pulse wave that drives an internal transistor (or transistors in a synchronous device), rapidly switching the transistor(s) at a set frequency, typically in the range of a few megahertz. The output voltage of such a DC-to-DC voltage converter is proportional to the duty cycle of the drive pulse. A voltage- or current-feedback control loop allows the PWM controller output to regulate the output voltage in response to load changes.

Components such as central processing units (CPUs), memory modules, and application-specific integrated circuits (ASICs) require power supplies that maintain a tightly regulated output voltage under fast high-current transient conditions. To achieve this regulation, many DC-to-DC converters incorporate a very large output capacitance. However, incorporating such a large output capacitance is costly and limits power density.

SUMMARY

Illustrative aspects of the present disclosure are directed to a control circuit for controlling a power stage of a DC-to-DC voltage converter. The control circuit includes a plurality of control blocks and a multiplexer. Each control block implements a different control scheme to provide a pulse-width modulation (PWM) signal to an output of the corresponding control block. The multiplexer has a plurality of multiplexer inputs, at least one select line, and an output. Each of the multiplexer inputs is coupled to one of the control block outputs. The at least one select line is coupled to receive information regarding a present phase of a switching period of the DC-to-DC voltage converter. The multiplexer output is coupled to the power stage of the DC-to-DC voltage converter to drive the power stage.

Other illustrative aspects of the present disclosure are directed to a method of determining a value of a PWM signal with which to drive a power stage of a DC-to-DC voltage converter. The DC-to-DC voltage converter has an output inductor coupled between the power stage and an output node that is couplable to a load. Pursuant to said method, a plurality of control schemes for determining a value of a PWM signal with which to drive the power stage are maintained. A value of the PWM signal currently driving the power stage is monitored. A value of an inductor current flowing through the output inductor is monitored. A value of a load current being provided to the load is monitored. One of the plurality of control schemes is selected based on the value of the PWM signal currently driving the power stage, the value of the inductor current, and the value of the load current. The selected control scheme is used to determine a value of a PWM signal with which to drive the power stage.

Other illustrative aspects of the present disclosure are directed to a DC-to-DC voltage converter that includes a power stage, an output stage and a control circuit. The power stage includes a voltage input and a switching transistor. The switching transistor has first, second and third terminals. A voltage level at the first terminal controls in part a current flow from the second terminal to the third terminal. The second terminal is coupled to the voltage input. The output stage includes an output inductor and an output capacitor. The output inductor is coupled between the third terminal of the switching transistor and a voltage output that is couplable to a load. The output capacitor is coupled between the voltage output and ground. The control circuit includes a plurality of control blocks and a multiplexer. Each control block implements a different control scheme to provide a PWM signal to an output of the corresponding control block. The multiplexer has a plurality of multiplexer inputs, at least one select line and a multiplexer output. Each input of the multiplexer is coupled to one of the control block outputs. The at least one select line is coupled to receive information regarding a present phase of a switching period of the DC-to-DC voltage converter. The multiplexer output is coupled to the first terminal of the switching transistor to drive said switching transistor.

DETAILED DESCRIPTION

Illustrative aspects of the present disclosure are directed to techniques for efficiently regulating the output voltage of a DC-to-DC converter to achieve ultra-fast dynamic response, thus significantly reducing the required output capacitance. Aspects of the present disclosure are applicable to many types of DC-to-DC voltage converters that employ pulse-width modulation (PWM) to achieve voltage regulation, including buck converters and other buck-derived topologies.

Figure 1:
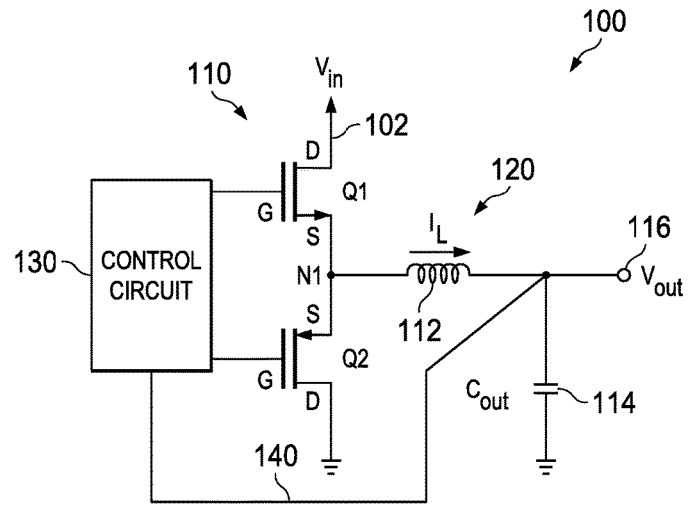
FIG. 1 is a schematic circuit diagram representing an illustrative DC-to-DC voltage converter.

FIG. 1 is a schematic circuit diagram representing an illustrative DC-to-DC voltage converter 100. The type of DC-to-DC voltage converter 100 depicted in FIG. 1 is sometimes referred to as a buck converter. The DC-to-DC voltage converter 100 includes a power stage 110 that includes a high-side transistor Q1 and a low-side transistor Q2 that serve as switches. In the illustrative embodiment shown in FIG. 1, the high-side transistor Q1 is an NMOS (n-channel metal-oxide-semiconductor field-effect) transistor and the low-side transistor Q2 is a PMOS (p-channel metal-oxide-semiconductor field-effect) transistor, but other transistor configurations are possible, as will be appreciated by those of skill in the art. The drain of transistor Q1 is coupled to a voltage input 102 that is couplable to a power supply. During operation of the DC-to-DC voltage converter 100, the voltage input 102 operates at an input voltage $V_{in}$, which is a DC voltage that is to be converted to another DC voltage by the DC-to-DC voltage converter 100. The source of transistor Q1 is coupled to a switch node N1. The source of transistor Q2 is coupled to the switch node N1 and the drain of transistor Q2 is coupled to a ground node. The ground node may operate at a potential of ground or a potential that is different than or lower than the input voltage $V_{in}$.

The DC-to-DC voltage converter 100 further includes an output stage 120 that includes an inductor 112, an output capacitor 114, and an output node 116 that is couplable to a load. A first terminal of the inductor 112 is coupled to the switch node N1. The second terminal of the inductor 112 is coupled to the output capacitor 114. The output 116, or output node, of the DC-to-DC voltage converter 100 operates at an output voltage $V_{out}$ and is coupled to the junction of the inductor 112 and the output capacitor 114. The output voltage $V_{out}$ is the DC voltage generated by the DC-to-DC voltage converter 100.

The gates of transistors Q1 and Q2 are coupled to a control circuit 130 that generates gate voltages to turn the transistors Q1 and Q2 off and on. Accordingly, the control circuit 130 serves as a switch controller to control the switching function of transistors Q1 and Q2. The DC-to-DC voltage converter 100 receives the input voltage $V_{in}$ at the input 102. At times when the control circuit 130 is causing the transistors Q1 and Q2 to switch, the control circuit turns transistors Q1 and Q2 on and off such that one transistor is on while the other transistor is off. The on and off periods control the current $I_L$ flowing through the inductor 112. The current $I_L$ generates a voltage across the output capacitor $C_{out}$ 114, which is the output voltage $V_{OUT}$ of the DC-to-DC voltage converter 100. In discontinuous modes of operation, both transistor Q1 and transistor Q2 are turned off at the same time for a period. As mentioned previously, the DC-to-DC converter 100 shown in FIG. 1 is merely illustrative. The illustrative converter 100 of FIG. 1 employs a synchronous power stage 110 with two synchronous transistors Q1 and Q2. Alternative embodiments can employ a single power stage transistor that drives the output stage 120.

In an illustrative embodiment, the control circuit 130 uses pulse-width modulation (PWM) to regulate the output voltage $V_{out}$. Thus, the control circuit 130 produces rectangular pulse waves that drive the switching transistors Q1 and Q2, rapidly switching the transistors at a set frequency. The output voltage $V_{out}$ is proportional to the duty cycle of the drive pulses. A feedback control loop 140 allows the control circuit 130 to adjust the duty cycle of the PWM signal provided to the gates of transistors Q1 and Q2 to regulate the output voltage $V_{out}$ in response to load changes.

The control circuit 130 functions to regulate the output voltage $V_{out}$ and keep it within a desired range. In order to precisely regulate the output voltage $V_{out}$, it is most effective to cause the inductor current $I_L$ to track the load current $I_{load}$ as closely as possible. Discrepancies between the inductor current $I_L$ and the load current $I_{load}$ are made up by current flow to or from the output capacitor $C_{out}$ 114, which causes corresponding changes in the output voltage $V_{out}$. Therefore, aspects of the present disclosure aim to force the inductor current $I_L$ to track the load current $I_{load}$ as closely as possible.

Figure 2:
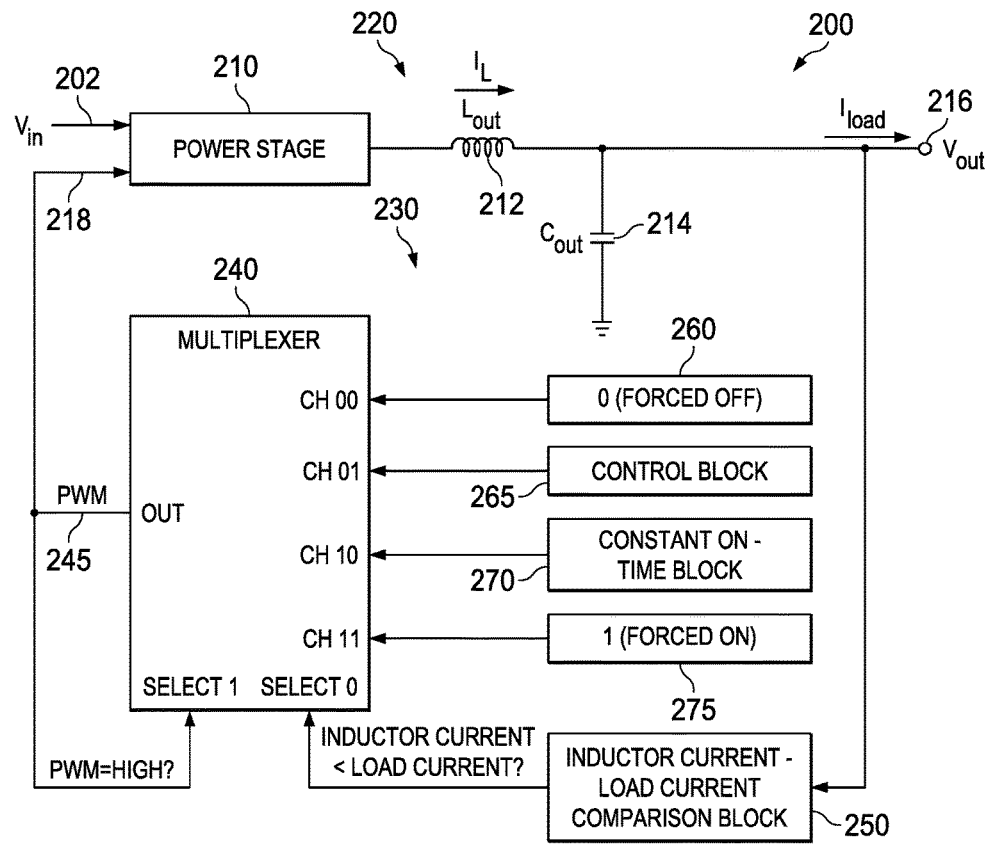
FIG. 2 is a schematic block diagram representing an illustrative DC-to-DC voltage converter, showing details of control functionality.

FIG. 2 is a schematic block diagram representing an illustrative DC-to-DC voltage converter 200, showing details of control functionality. The DC-to-DC voltage converter 200 of FIG. 2 can be thought of as corresponding to the DC-to-DC voltage converter 100 of FIG. 1. The DC-to-DC voltage converter 200 includes control circuitry 230 which can be thought of as corresponding generally to the control circuit block 130 of FIG. 1. The DC-to-DC voltage converter 200 of FIG. 2 includes a power stage 210 that receives an input voltage $V_{in}$ at voltage input 202 and a control signal at a control input 218. The power stage 210 can be implemented in a manner similar to the power stage 110 shown in FIG. 1 or in a manner consistent with alternative power stage topologies. In embodiments wherein the power stage 210 is implemented in a manner similar to the power stage 110 shown in FIG. 1, the control input 218 corresponds to the gate of a switching transistor such as MOSFET Q1 of FIG. 1. The DC-to-DC voltage converter 200 of FIG. 2 further includes an output stage 220 that includes output inductor $L_{out}$ 212, output capacitor $C_{out}$ 214, and output node 216. When active (as controlled by a driver signal applied to control input 218), the power stage 210 provides a current to output inductor $L_{out}$ 212, in a manner similar to that described above with respect to FIG. 1.

The control circuit 230 of the DC-to-DC voltage converter 200 includes a 4:1 digital multiplexer 240. The four multiplexer inputs (channel 00, channel 01, channel 10, channel 11) are coupled to four different control blocks 260, 265, 270 and 275, respectively. The four control blocks 260-275 represent four different control schemes for generating a pulse-width modulation (PWM) signal to be used to drive the power stage 210. Accordingly, the output 245 of the multiplexer 240 is coupled to the control input 218 (which, in illustrative embodiments, comprises a gate of a switching transistor) of power stage 210 to drive the power stage. The multiplexer 240 has two select lines. Select line 0 receives an indication of whether the inductor current $I_L$ through the output inductor $L_{out}$ 212 is greater than or less than the load current $I_{load}$ provided to a load coupled to converter output 216. In the illustrative embodiment of FIG. 2, select line 0 receives this indication from inductor current/load current comparison block 250. Select line 1 of multiplexer 240 receives an indication of the present state (i.e., high or low) of the PWM signal driving the power stage 210 of the DC-to-DC converter 200. In the illustrative embodiment of FIG. 2, the output 245 of the multiplexer, which provides the PWM signal that drives the power stage 210, is coupled directly to select line 1. Based on the values of select line 0 and select line 1, one of the four multiplexer inputs (channel 00, channel 01, channel 10, or channel 11) is selected and provided at the multiplexer output 245. Thus, based on the current state of the PWM signal and whether the inductor current $I_L$ is greater than or less than load current $I_{load}$, one of the four control blocks 260, 265, 270, or 275 is used to control the PWM signal that drives the power stage 210.

The two parameters provided to the select lines 0 and 1, namely the current state of the PWM signal and whether the inductor current $I_L$ is greater than or less than load current $I_{load}$, together define four states of a switching period of the power stage 210. The control blocks 260-275 include a "forced off" block 260, a control block 265, a constant on-time block 270 and a "forced-off" block 275. The operation of these blocks in conjunction with the switching period states defined by select lines 0 and 1 will be described in detail below.

Figures 3, 4:
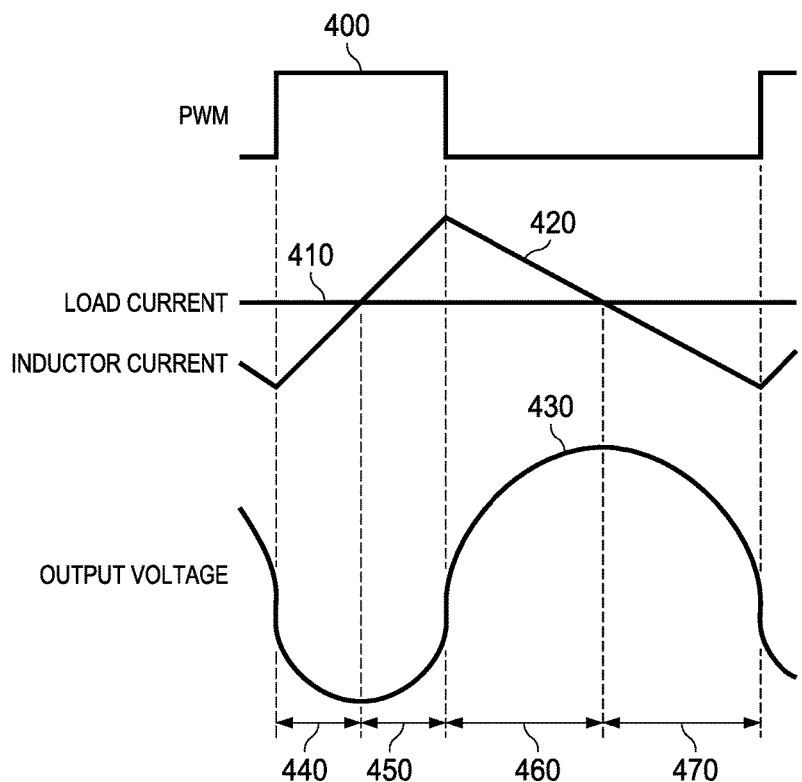
FIG. 3 is a table defining the selection of the inputs of the multiplexer of FIG. 3 based on the states of select line 0 and select line 1.
FIG. 4 is a timing diagram demonstrating the interrelation of a PWM signal, a load current, an inductor current, and an output voltage.

FIG. 3 is a table defining the selection of the inputs of the multiplexer 240 of FIG. 2 based on the states of select line 0 and select line 1. The multiplexer input selection table is best understood with reference to FIG. 4, which is a timing diagram demonstrating the interrelation of the PWM signal 400 driving the power stage 210 of FIG. 2, the load current $I_{load}$ 410, the inductor current $I_L$ 420, and the output voltage 430. In the control scheme represented by FIGS. 3 and 4, the switching period of a PWM signal 400 that drives the power stage 210 is divided into four operation states, which will be referred to herein as up-tracking state 440, constant-on state 450, down-tracking state 460, and control state 470. In each of these operation states, a different control scheme, as represented by control blocks 260-275 of FIG. 2, is used to generate the PWM signal that drives the power stage 210. The selection of the active channel of the multiplexer 240 is defined by the relative level of the inductor current $I_L$ relative to the load current $I_{load}$ (select line 0) and the current PWM state (select line 1).

The up-tracking state 440 is defined by the inductor current $I_L$ 420 being less than the load current $I_{load}$ 410 (i.e., select line 0 is logic-high) and the PWM signal 400 (and therefore select line 1) being logic-high. In the illustrative embodiment of FIG. 2, select line 0 receives the indication of whether the inductor current $I_L$ is less than or greater than the load current $I_{load}$ from inductor current/load current comparison block 250. When select line 0 and select line 1 are both 1's (logic-high), channel 11 of the multiplexer 240, which is coupled to the "forced-on" control block 275, is selected, meaning the output of the "forced on" control block 275 is provided at the output 245 of the multiplexer 240, and thus to the control input 218 of the power stage 210. The "forced-on" control block 275 forces the PWM signal 400 to turn on and remain on. In other words, the "forced on" control block 275 generates a logic-high output signal, which, when channel 11 of multiplexer 240 is selected, is provided at the output of multiplexer 240. When the PWM signal 400 driving the power stage 210 is on (logic-high), the inductor current $I_L$ 420 through output inductor 212 rises.

At the beginning of the up-tracking state 440, the inductor current $I_L$ 420 is at a minimum and is therefore less than the load current $I_{load}$ 410 by a maximum amount. Thus at the beginning of the up-tracking state 440, the output capacitor 214 is discharging at a maximum rate in order to make up for the current difference, and, in turn, the output voltage 430 is decreasing at a maximum rate. This rate of discharge decreases until $I_L=I_{load}$, at which point the output capacitor 214 stops discharging and there is therefore no current into or out of the output capacitor 214, and a valley (low point) is reached in the output voltage 430. When the inductor current $I_L$ 420 reaches the level of the load current $I_{load}$ 410, the multiplexer 240 will switch PWM control over to the constant on-time control block 270, as will be explained below.

The constant on-time state 450 is defined by the inductor current $I_L$ 420 being greater than the load current $I_{load}$ 410 (i.e., select line 0 is low) and the PWM signal 400 (and therefore select line 1) being high. When select line 0=0 (logic-low) and select line 1=1 (logic high), channel 10 of the multiplexer 240, which is coupled to the constant on-time control block 270, is selected, meaning the output of the constant on-time control block 270 is provided at the output 245 of the multiplexer 240, and thus to the control input 218 of the power stage 210. The constant on-time control block 270 causes the PWM signal 400 to remain on for a constant time period and then turns off. In other words, the constant on-time control block 270 generates a logic-high output signal for a predetermined and fixed period of time and then transitions low. In an illustrative embodiment, the duration of this constant on-time is set by a constant on timer (not shown). The duration of the constant on-time sets the switching frequency of the DC-to-DC voltage converter 200. In an alternative embodiment, the duration of the on-time in operation state 450 is variable based on the input voltage $V_{in}$ of the DC-to-DC converter in order to aim to maintain a substantially fixed switching frequency. In the embodiment wherein the on-time is fixed, when channel 10 of multiplexer 240 is selected, the constant on-time signal is provided at the output 245 of multiplexer 240 and therefore defines the PWM signal 400 that drives the power stage 210. In the constant on-time operation state 450, the inductor current $I_L$ 420 continues to rise until the PWM signal 400 goes low at the end of the constant-on time period.

The inductor current $I_L$ 420 is equal to the load current $I_{load}$ 410 at the beginning of the constant on-time state 450 and then steadily increases. To make up for the current difference, current begins to flow to the output capacitor 214, causing the output capacitor 214 to start charging. The charging rate, and thus the rate of change of the output voltage 430, increases with the inductor current $I_L$ 420 until both reach a maximum at the end of the constant on-time state 450. When the PWM signal 400 goes low at the end of the constant-on time period, the multiplexer 240 switches PWM control over to the "forced off" control block 260, thus switching the operation state to the down-tracking operation state 460 as will be explained below.

The down-tracking state 460 is defined by the inductor current $I_L$ 420 being greater than the load current $I_{load}$ 410 (i.e., select line 0 is low) and the PWM signal 400 (and therefore select line 1) being low. When select line 0=0 (logic-low) and select line 1=0 (logic-low), channel 00 of the multiplexer 240, which is coupled to the "forced off" control block 260, is selected, meaning the output of the "forced off" control block 260 is provided at the output 245 of the multiplexer 240, and thus to the control input 218 of the power stage 210. The "forced off" control block 260 forces the PWM signal 400 to turn off and to remain off. In other words, the "forced off" control block 260 generates a logic-low output signal, which, when channel 00 of multiplexer 240 is selected, is provided at the output 245 of multiplexer 240. With the PWM signal 400 driving the power stage 210 being off (logic-low), the inductor current $I_L$ 420 through output inductor 212 drops.

At the beginning of the down-tracking state 460, the inductor current $I_L$ 420 is at a maximum and is therefore greater than the load current $I_{load}$ 410 by a maximum amount. Thus at the beginning of the up-tracking state 460, the output capacitor 214 is charging at a maximum rate in order to make up for the current difference, and, in turn, the output voltage 430 is increasing at a maximum rate. This charging rate decreases until $I_L=I_{load}$, at which point the output capacitor 214 stops charging and there is therefore no current into or out of the output capacitor 214, and a peak is reached in the output voltage 430. When the inductor current $I_L$ 420 drops to the level of the load current $I_{load}$ 410, the multiplexer 240 switches PWM control over to a control block 265, thus switching the operation state to the control state 470 as will be explained below.

The control state 470 is defined by the inductor current $I_L$ 420 being less than the load current $I_{load}$ 410 (i.e., select line 0 is high) and the PWM signal 400 (and therefore select line 1) being low. When select line 0=1 (logic-high) and select line 1=0 (logic-low), channel 01 of the multiplexer 240, which is coupled to the control block 265, is selected, meaning the output of the control block 265 is provided at the output 245 of the multiplexer 240, and thus to the control input 218 of the power stage 210. The control block 265 causes the PWM signal 400 to remain off for a controller-determined period of time and then turn on. In other words, the control block 265 generates an output signal that is logic-low for a period of time determined by the control block 265 and then goes high. In an illustrative embodiment, this period of time is determined using a charge-balance control method, but many other control methods can be used as well. The charge-balance control method will be described below with respect to FIGS. 8 and 9. When channel 01 of multiplexer 240 is selected, the output of the control block 265 is provided at the output 245 of multiplexer 240 and therefore defines the PWM signal 400 that drives the power stage 210. In the control state 470, the inductor current $I_L$ 420 continues to decrease until the PWM signal 400 goes high at the time determined by the control block 265.

The inductor current $I_L$ 420 is equal to the load current $I_{load}$ 410 at the beginning of the control state 470 and then steadily decreases. To make up for the current difference, the output capacitor 214 begins discharging, causing current to flow from the output capacitor 214. The rate of discharging, and thus the rate of change of the output voltage 430, increases as the inductor current $I_L$ 420 drops, until the inductor current $I_L$ 420 reaches a minimum at the end of the control state 470. When the PWM signal goes high at the time determined by the control block 265, the multiplexer 240 switches PWM control back to the "forced on" control block 275, thus switching the operation state to the up-tracking operation state 440 as described above.

As can be seen in FIG. 4, with the control scheme of the present disclosure, the level of the inductor current $I_L$ crosses the level of the load current $I_{load}$ twice in each switching period. Thus the inductor current $I_L$ closely tracks the load current $I_{load}$, resulting in minimum output voltage deviation.

Figure 5:
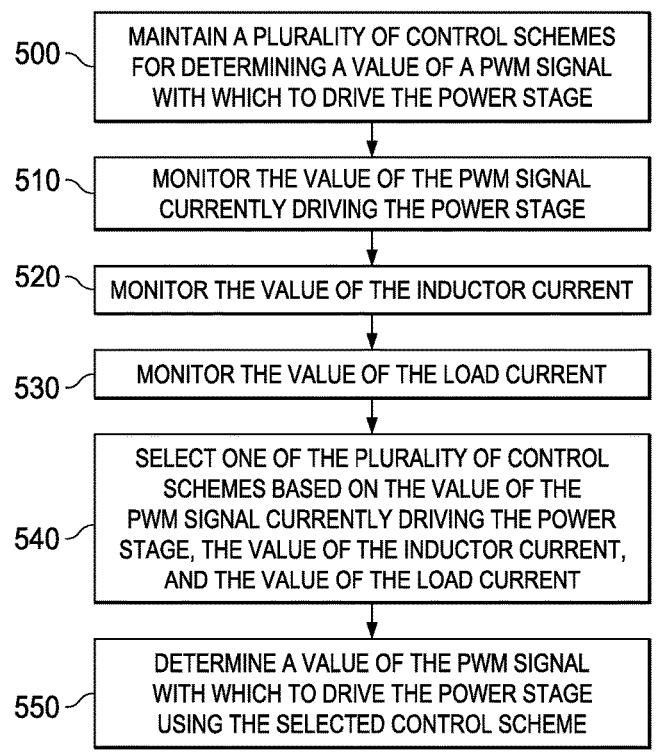
FIG. 5 is a flowchart representing a method of determining a value of a PWM signal with which to drive a power stage of a DC-to-DC voltage converter.

FIG. 5 is a flowchart representing a method of determining a value of a PWM signal with which to drive a power stage 210 of a DC-to-DC voltage converter 200. The DC-to-DC voltage converter 200 includes an output inductor 212 coupled between the power stage 210 and an output node 216 that is couplable to a load. At block 500 of FIG. 5, a plurality of control schemes for determining a value of a PWM signal with which to drive the power stage 210 are maintained. At block 510, a value of the PWM signal currently driving the power stage 210 is monitored. At block 520, a value of an inductor current flowing through the output inductor 212 is monitored. At block 530, a value of a load current being provided to the load is monitored. At step 540, one of the plurality of control schemes is selected based on the value of the PWM signal currently driving the power stage 210, the value of the inductor current, and the value of the load current. At step 550, the selected control scheme is used to determine a value of the PWM signal with which to drive the power stage 210.

Figure 6:
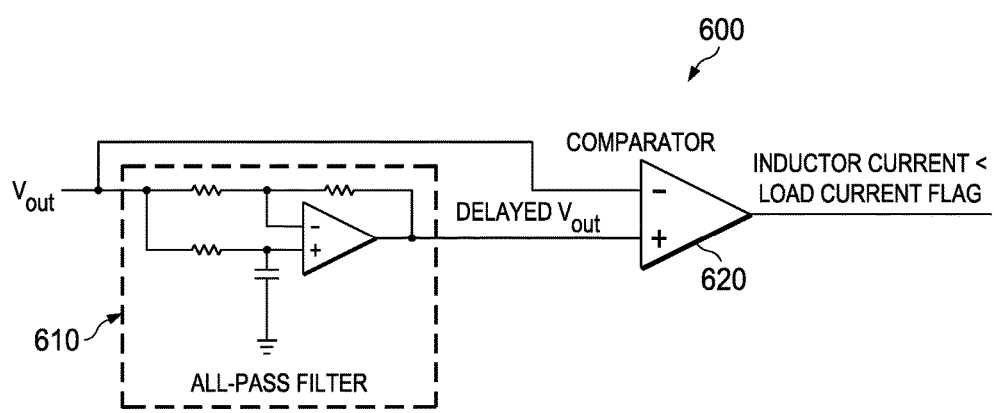
FIG. 6 is a circuit diagram representing an implementation of an inductor current/load current comparison block that extracts the inductor current/load current comparison from the output voltage.

The inductor current/load current comparison block 250 of FIG. 2 can implement the inductor current/load current comparison in a variety of ways. In an illustrative embodiment, the inductor current/load current comparison is extracted from the output voltage $V_{out}$ 430. FIG. 6 is a circuit diagram representing an implementation of an inductor current/load current comparison block 600 that extracts the inductor current/load current comparison from the output voltage $V_{out}$ 430. The inductor current/load current comparison block 600 includes an all-pass filter 610 and a comparator 620. The all-pass filter 610 is a standard all-pass filter, the operation of which will be readily understood by one of skill in the art. The all-pass filter 610 receives the real-time output voltage $V_{out}$, such as shown at the voltage output 216 of FIG. 2 and as represented as output voltage plot 430 in FIG. 4. The all-pass filter 610 creates a delayed output voltage signal based on the real-time output voltage $V_{out}$.

Figure 7:
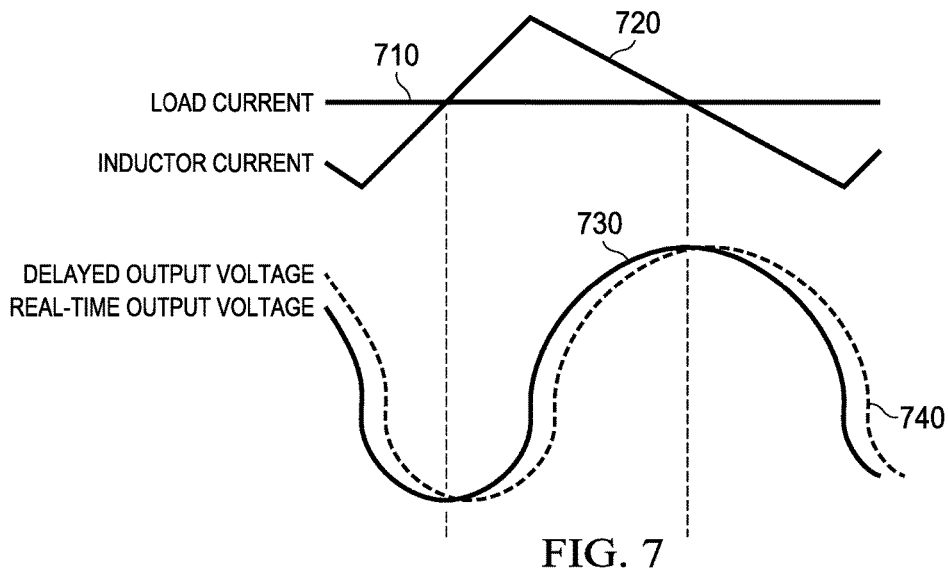
FIG. 7 is a timing diagram demonstrating the interrelation of a load current, an inductor current, a real-time output voltage, and a delayed output voltage.

FIG. 7 is a timing diagram demonstrating the interrelation of the load current $I_{load}$ 710, the inductor current $I_L$ 720, the real-time output voltage $V_{out}$ 730 and the delayed output voltage 740. As can be seen in FIG. 7, if the real-time output voltage signal $V_{out}$ 730 is greater than the delayed output voltage signal 740, it means the output voltage $V_{out}$ 730 is increasing, which in turn indicates that inductor current $I_L$ 720 is greater than load current $I_{load}$ 710. Conversely, if the real-time output voltage signal $V_{out}$ 730 is lower than the delayed output voltage signal, it means the output voltage $V_{out}$ 730 is decreasing, which in turn indicates that the inductor current $I_L$ 720 is less than the load current $I_{load}$ 710.

The comparator 620 compares the real-time output voltage signal $V_{out}$ 730 and the delayed output voltage signal 740. If the real-time output voltage signal $V_{out}$ 730 is greater than the delayed output voltage signal 740, the comparator 620 outputs a "0," indicating that the inductor current $I_L$ 720 is greater than the load current $I_{load}$ 710. Conversely, if the real-time output voltage signal $V_{out}$ 730 is lower than the delayed output voltage signal, the comparator 620 outputs a "1," indicating that the inductor current $I_L$ 720 is greater than the load current $I_{load}$ 710.

As mentioned above, in the control state 470 of FIG. 4, the time at which the PWM signal 400 is made to go high is determined by the control block 265. The control block 265 can use any of a variety of control methods to determine the period of time that the PWM signal 400 stays low before going high. In an illustrative embodiment, this period of time is determined using a charge-balance control method. Charge-balance control provides time-optimal transient response by employing the charge-balance principle of the output capacitor 214. A $V_{out}$ error voltage $V_{err}$ is defined as the difference between the output voltage $V_{out}$ and a target voltage $V_{ref}$. It has been demonstrated that the optimal switch-on time following an unloading transient is when the error voltage $V_{err}$ drops to a voltage threshold, $V_{sw}$, that is defined as $V_{sw}=D \cdot V_{pk}$, where D is the steady state duty cycle of the PWM signal driving the power stage 210, and $V_{pk}$ is the peak error voltage. Both variables are defined in FIG. 8, which is a timing diagram demonstrating the interrelation of the PWM signal 800, the load current $I_{load}$ 810, the inductor current $I_L$ 820, and the error voltage $V_{err}$ in a charge-balance control scheme in the event of an unloading transient.

Figure 8:
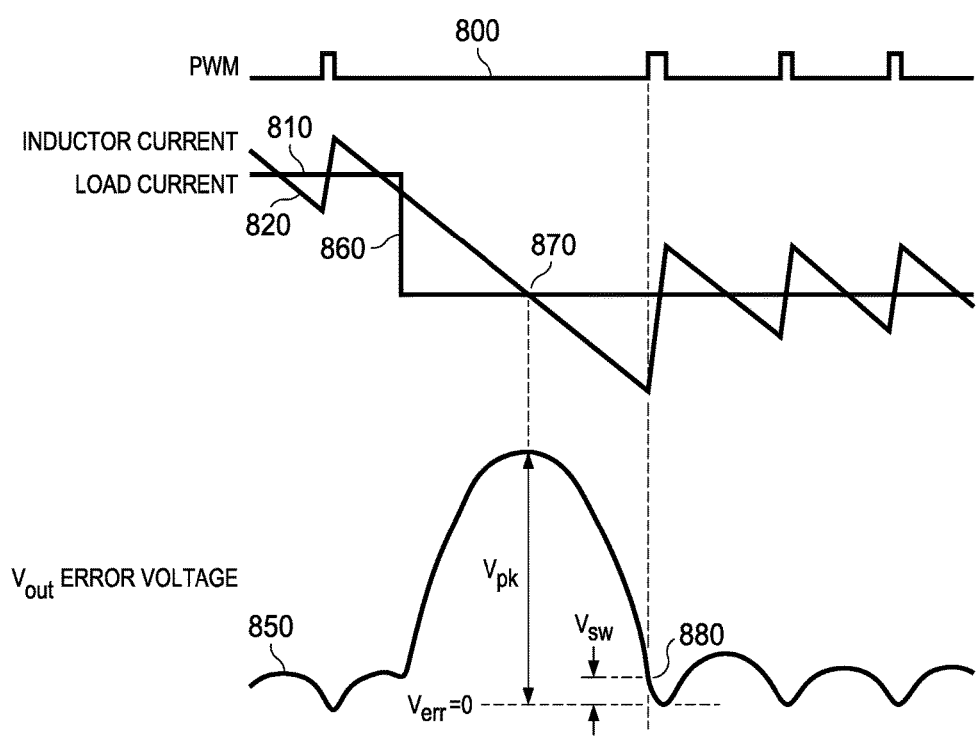
FIG. 8 is a timing diagram demonstrating the interrelation of a PWM signal, a load current, an inductor current, and an error voltage in a charge-balance control scheme in the event of an unloading transient.

In FIG. 8, the load current $I_{load}$ 810 experiences an unloading transient, characterized by an extreme drop in load current $I_{load}$ 810 in a very short period period of time. The unloading transient 860 of FIG. 8 occurs at a time when the PWM signal 800 is low and the inductor current $I_L$ 820 had recently dropped below the load current $I_{load}$ 810. Thus the unloading transient 860 occurs during the control state 470 (referring to FIG. 4) and the control block 265 is controlling the PWM signal, as selected by the multiplexer 240. When the unloading transient 860 occurs, the load current $I_{load}$ 810 quickly drops below the inductor current $I_L$ 820. The inductor current $I_L$ 820 continues to steadily drop since the PWM signal 800 remains low.

The unloading transient 860 causes the load current $I_{load}$ 810 to drop to a level that is significantly less than the inductor current $I_L$ 820. The excess inductor current thus flows into the output capacitor 214, causing the output capacitor 214 to charge at a relatively high rate, in turn causing the output voltage $V_{out}$ to increase at a high rate. This increase in the output voltage is reflected in the error voltage $V_{err}$ 850, which spikes when the unloading transient 860 occurs. The error voltage $V_{err}$ 750 continues to increase until the inductor current $I_L$ 820 drops to the reduced level of the load current $I_{load}$ 810 at time 870, at which point there is no current flow into or out of the output capacitor 214. Thus the error voltage reaches its peak $V_{pk}$ at time 870. As the inductor current $I_L$ continues to drop below the reduced level of the load current $I_{load}$, the output capacitor 214 begins discharging and the output voltage $V_{out}$, and therefore the error voltage $V_{err}$ 850, begins to drop from its elevated level. When the error voltage $V_{err}$ drops to $V_{sw}$ at point 880, the control block 265 causes its PWM output to go high. As can be seen in FIG. 8, turning on the PWM signal 800 when $V_{err}=V_{sw}$ results in the inductor current $I_L$ 820 crossing the load current $I_{load}$ 8/10 at the same time as $V_{out}=V_{ref}$, i.e., $V_{err}=0$.

Figure 9:
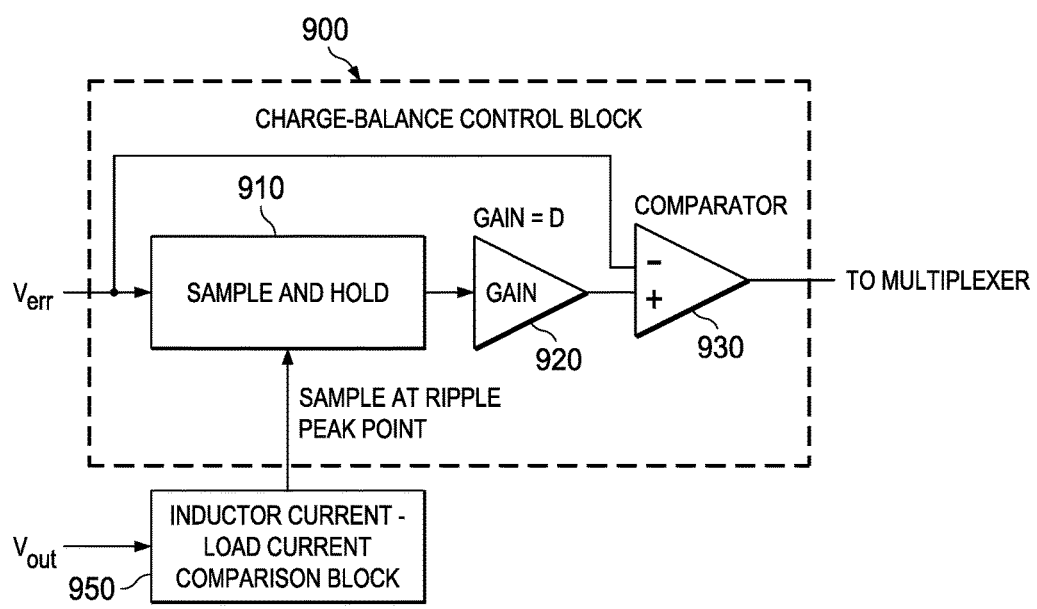
FIG. 9 is a schematic circuit diagram representing an illustrative implementation of a control block that employs a charge-balance control scheme.

FIG. 9 is a schematic circuit diagram representing an illustrative implementation of the control block 265 that employs a charge-balance control scheme. The charge-balance control block 900 of FIG. 9 includes a sample-and-hold circuit 910, a gain amplifier 920, and a comparator 930. The sample-and-hold circuit 910 receives the error voltage signal $V_{err}$ 850. The sample-and-hold circuit 910 also receives, as a control signal, the output of an inductor current/load current control block 950, which functions in the same manner as the inductor current/load current control block 250 described with respect to FIG. 2. Thus the output of the inductor current/load current control block 250 changes (e.g., goes high) when the inductor current $I_L$ 820 crosses (e.g., drops below) the load current $I_L$ 810. The sample-and-hold circuit 910 samples the error voltage signal $V_{err}$ 850 when it receives this indication from the inductor current/load current control block 950. Because the error voltage $V_{err}$ 850 is at its peak when the inductor current $I_L$ 820 crosses the load current $I_L$ 810 (at time 870 in FIG. 8), this results in the sample-and-hold circuit 910 sampling the peak voltage $V_{pk}$ of the error voltage $V_{err}$ 850.

The gain amplifier 920 receives this peak voltage $V_{pk}$ and multiplies it by the steady-state (i.e., non-transient) duty cycle of the PWM signal 800. The output of the gain amplifier 920 is thus the threshold voltage $V_{sw}$, described above with respect to FIG. 8. The comparator 930 compares the error voltage 850 to the threshold voltage $V_{sw}$ and outputs a logic-high signal if the error voltage 850 is less than the threshold voltage $V_{sw}$ and outputs a logic-low signal if the error voltage 850 is greater than the threshold voltage $V_{sw}$. The output of the comparator 930 is the output of the control block 265 and is provided to the channel 01 input of the multiplexer 240. Thus the PWM signal generated by the control block 265 goes high as soon as the error voltage $V_{err}$ drops below the threshold voltage $V_{sw}$. In an illustrative embodiment, the charge-balance control block 900 operates in both steady state and during load transients. In order to use the charge-balance control logic 900 in steady state to determine the PWM turn-on point, the output voltage $V_{out}$ is amplified by an analog circuit. The $V_{err}$ signal shown in FIG. 9 is after such amplification.

During load transients, the multiplexer 240 continues to determine which of the control blocks 260-275 will control the PWM signal provided to the power stage 210 based on the current PWM value and on the relative value of the inductor current $I_L$ and the load current $I_{load}$. Therefore, depending on how a given load transient affects the relative value of the inductor current $I_L$ 420 and the load current $I_{load}$ 410, control may at times jump between the operation states 440-470, instead of cycling sequentially through the four states 440, 450, 460 and 470 at all times.

In steady state, the duration of the up-tracking state 440 is approximately equal to half of the total on-time, because the inductor current $I_L$ 420 tracking the load current $I_{load}$ 410 results in the average inductor current $I_L$ being approximately equal to the average load current $I_{load}$. But when a transient load step occurs in this state 440, the inductor current and load current crossing point will change. Therefore, the duration of this state 440 will be extended (loading transient) or truncated (unloading transient). In either case, the multiplexer 240 will cause the operation state to enter the constant-on state 450, because the inductor current $I_L$ becomes greater than the load current $I_{load}$ while the PWM signal 400 is high.

If a loading transient occurs during the constant-on state 450, the operation state will automatically jump to the up-tracking state 440, since the load current $I_{load}$ becomes greater than the inductor current $I_L$ while the PWM signal 400 is high. If an unloading transient occurs during the constant-on state 450, the inductor current $I_L$ remains less than the load current $I_{load}$, so the multiplexer 240 will keep the operation state in the constant-on state 450, thus keeping its output PWM signal 245 high, until the on-timer expires. In an alternative embodiment, a comparator is used to turn-off the PWM signal 400 early when the output error voltage $V_{err}$ exceeds a threshold, in order to improve dynamic response.

In steady state, the duration of the down-tracking state 460 is approximately equal to half of the total off-time. If a load step occurs during this state, the inductor current and load current crossing point will change. Therefore, the duration of this state 460 will be truncated (loading transient) or extended (unloading transient). In either case, the multiplexer 240 will cause the operation state to enter the control state 470, because the inductor current $I_L$ becomes less than the load current $I_{load}$ while the PWM signal 400 is low.

In the illustrative embodiment wherein the control block 265 employs a charge-balance control scheme, if a loading transient occurs during the control state 470, the error voltage $V_{err}$ will drop to the threshold voltage $V_{sw}$ more quickly, and thus the operation state will enter the up-tracking state 440 early. If an unloading transient occurs during the control state 470, the load current $I_{load}$ will become less than inductor current $I_L$, and therefore the operation state will automatically jump to the down-tracking state 460.

As in a constant on-time (COT) system, the duration of the constant on-time in the constant on-time state 450 determines the switching frequency of the DC-to-DC converter 200. Any variation in the input voltage $V_{in}$ will also affect the switching frequency. In illustrative embodiments, the control circuitry 130 of the DC-to-DC voltage converter 100 employs switching frequency control methods sometimes employed in COT systems to achieve a pseudo-fixed switching frequency. Such methods can include input voltage feed-forward control, phase-locked loops, and other switching frequency control schemes.

As described above with respect to FIGS. 6 and 7, the constant on-time state 450 is triggered when the output voltage valley point is detected. However, the voltage drop due to the equivalent series resistance (ESR) of the output capacitor 214 will be superposed on the voltage of capacitance. As a result, the output voltage valley point will be shifted, and will occur in advance of the crossing point of the inductor current $I_L$ 720 and the load current $I_{load}$ 710. If this error is not compensated, the effective constant on-time will be shortened, and the switching frequency will be higher than intended. It can be mathematically demonstrated that the $V_{out}$ valley point's time advance $t_{adv}$ caused by ESR is equal to $t_{adv} = R_{ESR} \cdot C_{out}$, where $R_{ESR}$ is the equivalent series resistance of the output capacitor 214 and $C_{out}$ is the output capacitance. Thus, high ESR causes large time-advance $t_{adv}$ of the valley point and thus increases the switching frequency. When the time-advance $t_{adv}$ is greater than the constant on-time (which is designed to be half of the desired on-time), the switching frequency will not further increase but is clamped at twice the desired switching frequency. This is because the constant on-time starts to count as soon as the PWM signal 400 goes high, which gives an on-time of half of the originally designed on-time.

In some illustrative embodiments, a ceramic capacitor is used for the output capacitor 214 because ceramic capacitors have relatively low ESR. It will be noted that the ESR-caused time-advance will cancel the time delays in other analog components such as all-pass filters, comparators, MOSFET gate drivers, etc. Therefore, through careful design, the time-advance caused by ESR may be cancelled by the time delay caused by the control circuitry.

The control method of the present disclosure offers very fast dynamic response, especially when the inductor current slew rate is faster than the load current slew rate. This is more likely to be the case at high switching frequencies where the output inductor 212 can be small. For applications where the input voltage $V_{in}$ is much greater than the output voltage $V_{out}$, the inductor current slew rate at ON time, $(V_{in} - V_{out})/L$, is very high. As a result, the inductor current $I_L$ 420 can track the load current $I_{load}$ 410 within a very short time period, providing minimum undershoot voltage deviation. This allows the reference voltage $V_{ref}$ to be set at the low end of the regulation range. This provides two advantages. First, users can achieve significant power saving. For example, if the regulation range is ±5%, the $V_{out}$ set-point can be set at −4%; thus users can achieve 4% power savings. Second, the required output capacitance (limited by unloading transient) can be reduced by half since the allowed overshoot can utilize the full regulation window.

If load step current slew rate is slow or if the output inductor value is sufficiently small, such that the inductor current slew rate during OFF time (Vout/L) is faster than the load current slew rate, significant performance improvement can be achieved. In such a case, the control scheme of the present disclosure can facilitate the use of significantly reduced output capacitance relative to existing control schemes and still achieve the same voltage regulation performance.

While aspects of the present disclosure have been described herein with respect to certain illustrative embodiments, it is to be understood that the inventive concepts may be otherwise variously embodied and employed and that the appended claims are intended to be construed to include such variations except insofar as limited by the prior art.

What is claimed is:

1. A control circuit for controlling a power stage of a DC-to-DC voltage converter, the control circuit comprising:
   a plurality of control blocks, each control block configured to implement a different control scheme and operable to provide a pulse-width modulation (PWM) signal to an output of the corresponding control block,
   a multiplexer comprising:
      a plurality of multiplexer inputs, each input being coupled to a respective one of the control block outputs;
      at least one select line coupled to receive information regarding a present phase of a switching period of the DC-to-DC voltage converter; and
      a multiplexer output coupled to the power stage of the DC-to-DC voltage converter to the power stage; and
   an output inductor coupled between the power stage and an output node to be coupled to a load,
   wherein:
      the plurality of control blocks includes a first control block coupled to a first multiplexer input of the multiplexer, the first control block configured to generate a constant high PWM signal, and
      the multiplexer is configured to select the first multiplexer input in response to a first select line indicating an inductor current is less than a load current and a second select line indicating the PWM signal provided to the power stage is high.

2. The control circuit of claim 1 wherein the multiplexer is operable to selectively couple a PWM signal from one of the plurality of control blocks to the power stage of the DC-to-DC converter based on the received information regarding the present phase of the switching period of the DC-to-DC voltage converter.

3. The control circuit of claim 2 wherein the DC-to-DC converter comprises an output stage comprising:
   an output capacitor coupled between the output node and a ground.

4. The control circuit of claim 3 wherein the at least one select line of the multiplexer comprises:
   the first select line coupled to receive an indication of whether the inductor current is greater than or less than the load current; and
   the second select line coupled to receive an indication of whether the PWM signal provided to the power stage of the DC-to-DC converter is high or low.

5. The control circuit of claim 1, wherein the plurality of control blocks includes a second control block coupled to a second multiplexer input of the multiplexer, wherein the PWM signal generated by the second control block is high for a constant time period and low after the constant time period, and wherein the multiplexer is configured to select said second multiplexer input in response to the first select line indicating the inductor current is greater than the load current and the second select line indicating the PWM signal provided to the power stage is high.

6. The control circuit of claim 1 wherein the plurality of control blocks includes a third control block coupled to a third multiplexer input of the multiplexer, wherein said third control block generates the PWM signal, and wherein the multiplexer is configured to select said first multiplexer input in response to the first select line indicating the inductor current is greater than the load current and the second select line indicating the PWM signal provided to the power stage is low.

7. The control circuit of claim 1 wherein the plurality of control blocks includes a fourth control block coupled to a fourth multiplexer input of the multiplexer, wherein the PWM signal generated by said fourth stays low for a time period that is determined by said fourth control block and becomes high after the time period, and wherein the multiplexer is configured to select said fourth multiplexer input in response to the first select line indicating the inductor current is less than the load current and the second select line indicating the PWM signal provided to the power stage is low.

8. A method of operating a power stage of a DC-to-DC voltage converter including an output inductor coupled between the power stage and an output node to be coupled to a load, the method comprising:
   maintaining a plurality of control schemes for determining a value of a PWM signal with which to drive the power stage;
   monitoring a value of the PWM signal currently driving the power stage;
   monitoring a value of an inductor current flowing through the output inductor;
   monitoring a value of a load current being provided to the load;
   selecting one of the plurality of control schemes based on the value of the PWM signal provided to the power stage, the value of the inductor current, and the value of the load current; and
   comparing the value of the inductor current to the value of the load current,
   wherein said selecting one of the plurality of control schemes is based on the value of the PWM signal provided to the power stage, and on whether the value of the inductor current is greater than or less than the value of the load current, and
   wherein a first control scheme of said plurality of control schemes comprises generating a constant logic-high PWM signal, and wherein said first control scheme is selected if the value of the inductor current is less than the value of the load current and if the PWM signal provided to the power stage is logic-high.

9. The method of claim 8 wherein a second control scheme of said plurality of control schemes comprises generating a logic-high PWM signal for a constant time period and generating a logic-low PWM signal after the constant time period, and wherein said second control scheme is selected if the value of the inductor current is greater than the value of the load current and if the PWM signal provided to the power stage is logic-high.

10. The method of claim 8 wherein a third control scheme of said plurality of control schemes comprises generating a constant logic-low PWM signal, and wherein said third control scheme is selected if the value of the inductor current is greater than the value of the load current and if the PWM signal provided to the power stage is logic-low.

11. The method of claim 8 wherein a fourth control scheme of said plurality of control schemes comprises generating a logic-low PWM signal for a time period that is determined by the fourth control scheme and generating a logic high PWM signal after the time period, and wherein said fourth control scheme is selected if the value of the inductor current is less than the value of the load current and if the PWM signal provided to the power stage is logic-low.

12. A DC-to-DC voltage converter comprising:
   a power stage comprising:
      a voltage input; and
      a transistor having a gate terminal coupled to the voltage input;
   an output stage comprising:
      an output inductor coupled between the transistor and an output terminal to be coupled to a load; and
      an output capacitor coupled between said output terminal and a ground terminal; and
   a control circuit comprising:
      a plurality of control blocks, each control block configured to implement a different control scheme and operable to provide a pulse-width modulation (PWM) signal; and
      a multiplexer comprising:
         a plurality of multiplexer inputs, each input being coupled to one of the control block outputs;
         at least one select line coupled to receive information regarding a present phase of a switching period of the DC-to-DC voltage converter; and
         a multiplexer output coupled to the first terminal of the switching transistor to drive said switching transistor,
   wherein:
   the plurality of control blocks includes a first control block coupled to a first multiplexer input of the multiplexer, and configured to generate a constant high PWM signal, and
   the multiplexer is configured to select the first multiplexer input in response to a first select line indicating the inductor current is less than the load current and the second select line indicating the PWM signal provided to the gate terminal of the transistor is high.

13. The DC-to-DC voltage converter of claim 12 wherein the at least one select line of the multiplexer comprises:
   the first select line coupled to receive an indication of whether the inductor current through the output inductor is greater than or less than the load current; and
   the second select line coupled to receive an indication of whether the PWM signal provided to the gate terminal of the transistor is high or low.

14. The DC-to-DC voltage converter of claim 12 wherein the plurality of control blocks includes a second control block coupled to a second multiplexer input of the multiplexer, and configured to generate a PWM signal being high for a constant time period and being low after the constant time period, and wherein the multiplexer is configured to select said second multiplexer input in response to the first select line indicating the inductor current is greater than the load current and the second select line indicating the PWM signal provided to the gate terminal of the transistor is high.

15. The DC-to-DC voltage converter of claim 12 wherein the plurality of control blocks includes a third control block coupled to a third multiplexer input of the multiplexer, and configured to generate a constant low PWM signal, and wherein the multiplexer is configured to select said third multiplexer input in response to the first select line indicating the inductor current is greater than the load current and the second select line indicating the PWM signal provided to the gate terminal of the transistor is low.

16. The DC-to-DC voltage converter of claim 12 wherein an output of a fourth control block of the plurality of control blocks is coupled to a fourth multiplexer input of the multiplexer, wherein the PWM signal generated by said fourth control block is low for a constant time period and then goes high, and wherein the multiplexer is configured to select said fourth multiplexer input in response to the first select line indicating the inductor current is less than the load current and the second select line indicating the PWM signal provided to the gate terminal of the transistor is low.

* * * * *